Dec. 1, 1959  I. B. LASKOWITZ  2,915,129
JET-POWERED HELICOPTER ROTOR HEAD AND BLADE CONSTRUCTION
Filed May 3, 1955  4 Sheets-Sheet 1

INVENTOR
Isidor B. Laskowitz

BY [signature]
ATTORNEY

Dec. 1, 1959     I. B. LASKOWITZ     2,915,129
JET-POWERED HELICOPTER ROTOR HEAD AND BLADE CONSTRUCTION
Filed May 3, 1955     4 Sheets-Sheet 2
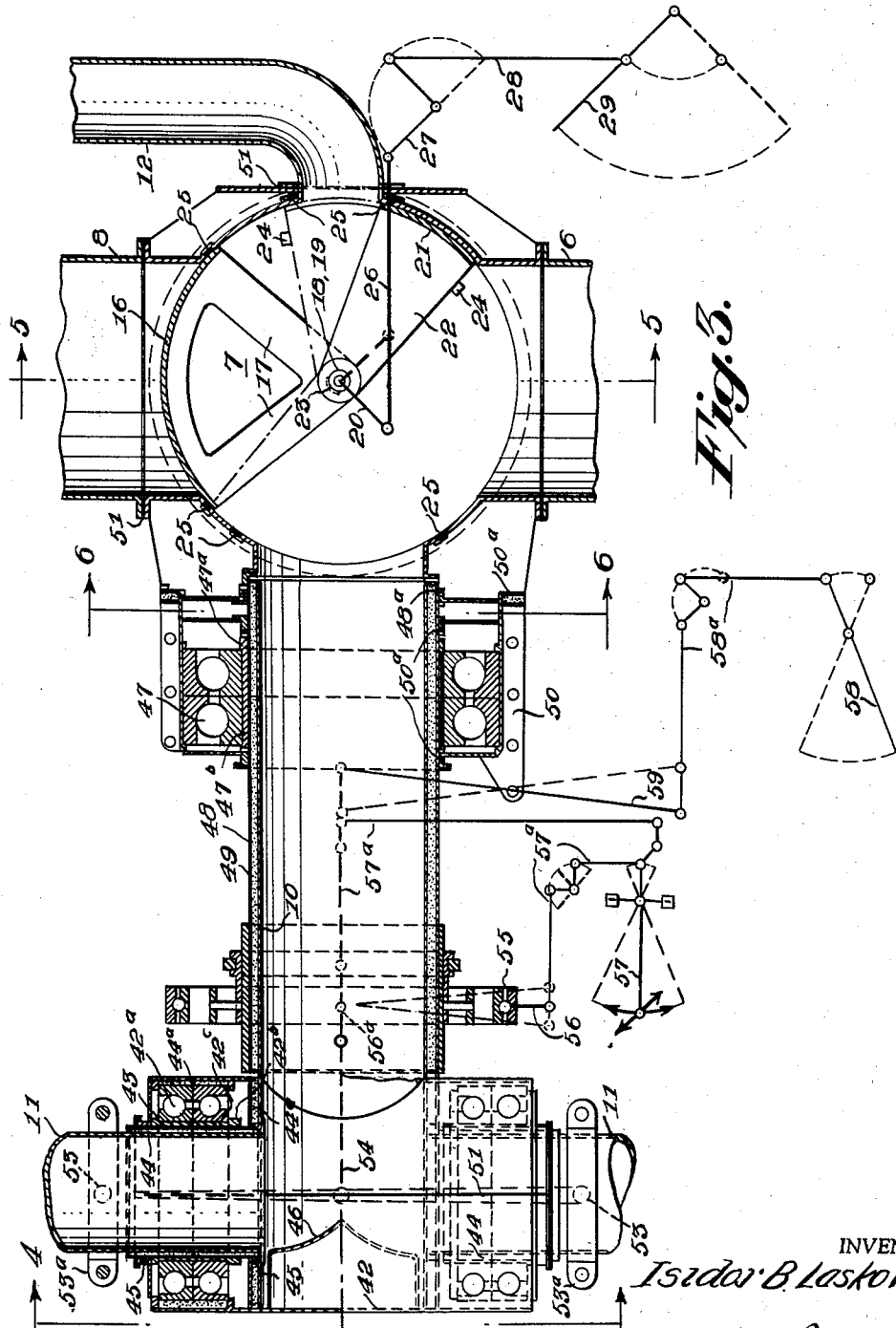
INVENTOR
*Isidor B. Laskowitz*
BY *Robert J. Dennison*
ATTORNEY Dec. 1, 1959     I. B. LASKOWITZ     2,915,129
JET-POWERED HELICOPTER ROTOR HEAD AND BLADE CONSTRUCTION
Filed May 3, 1955     4 Sheets-Sheet 3
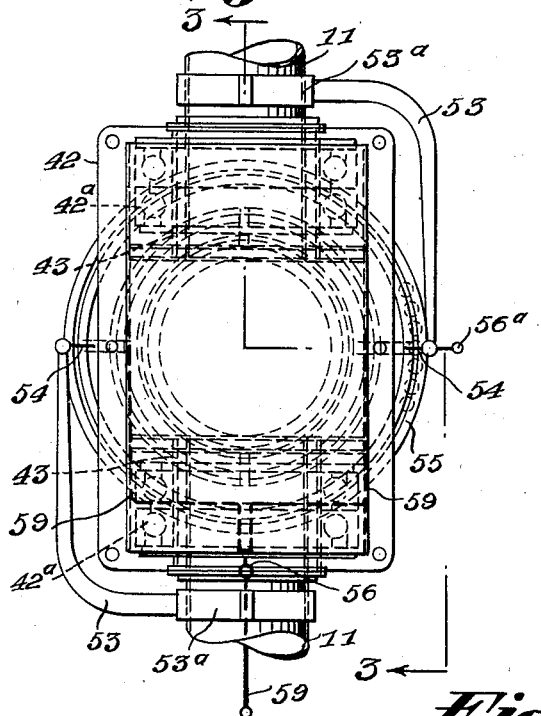
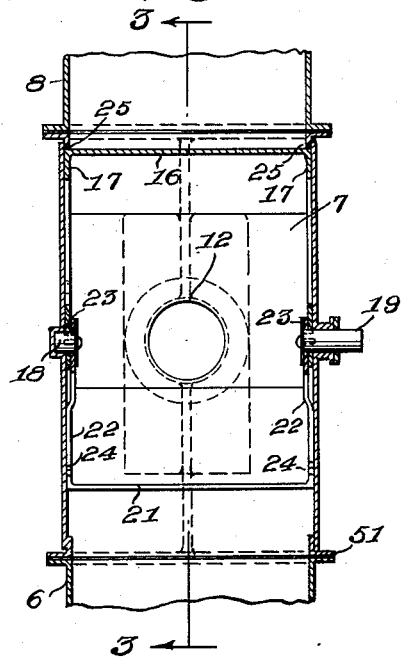
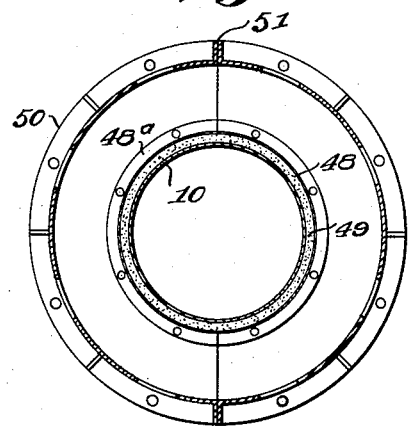
INVENTOR
Isidor B. Laskowitz
BY
ATTORNEY

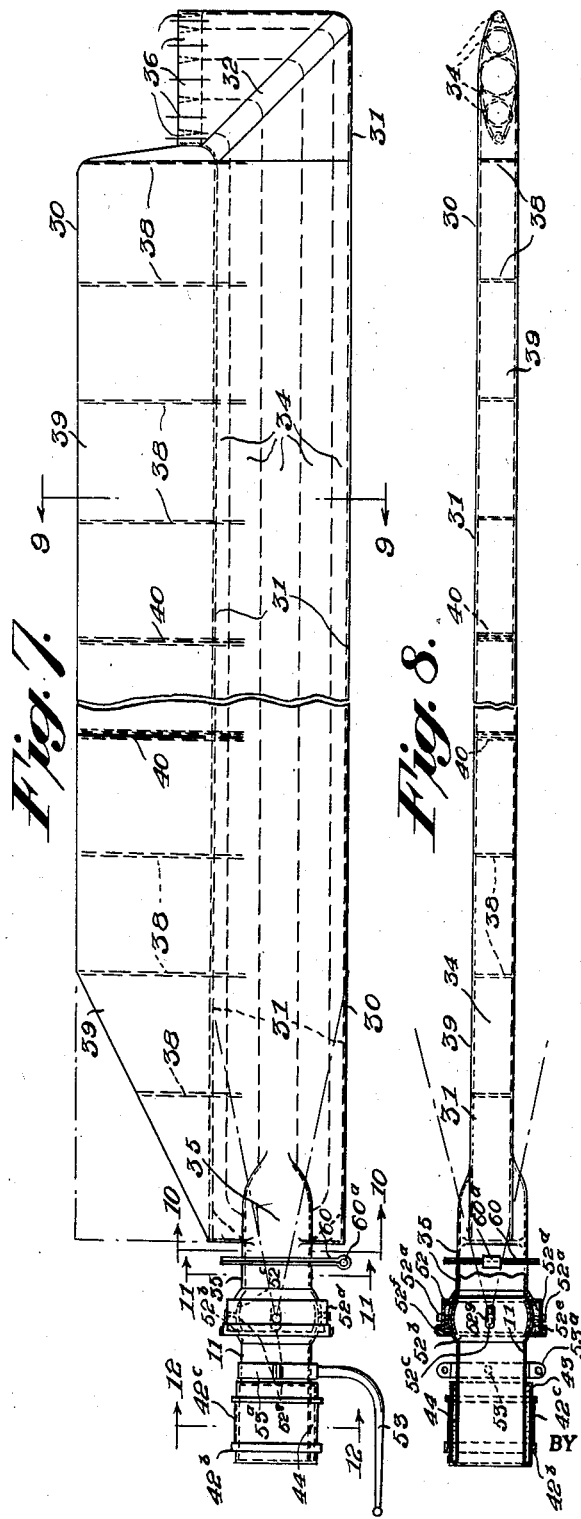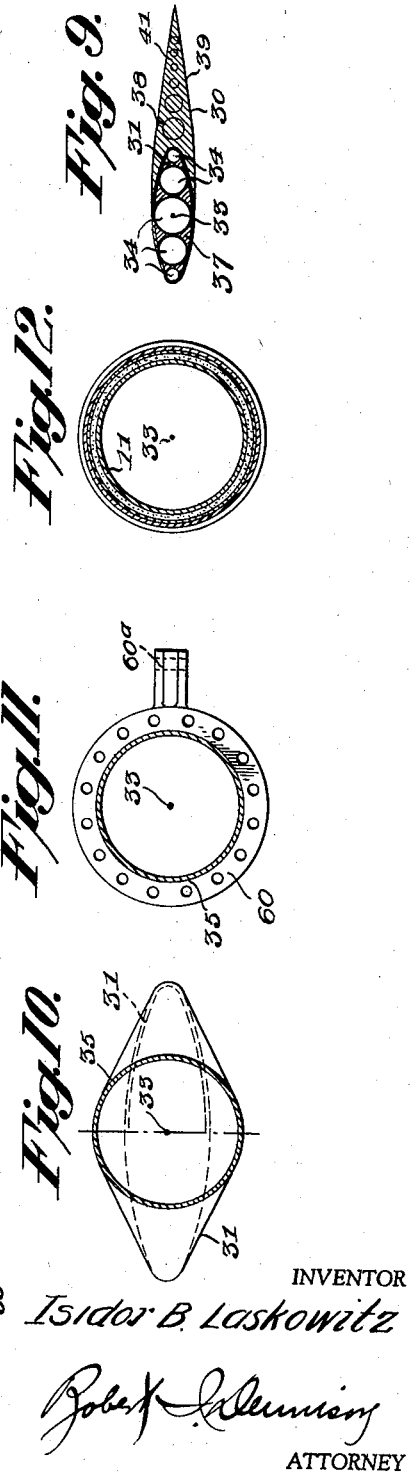

United States Patent Office 2,915,129
Patented Dec. 1, 1959

2,915,129

JET-POWERED HELICOPTER ROTOR HEAD AND BLADE CONSTRUCTION

Isidor B. Laskowitz, Brooklyn, N.Y.

Application May 3, 1955, Serial No. 505,737

1 Claim. (Cl. 170—135.4)

This invention relates to jet-powered helicopter and other rotary-wing aircraft rotor head and blade construction, and embodies certain improvements in jet-powered helicopters and convertible aircraft as disclosed in my copending application bearing Serial No. 211,903, filed February 20, 1951, now Patent No. 2,756,007.

A major problem in the design of rotor heads and rotor blades for helicopters and other rotary-wing aircraft systems employing the pressure jet principle, which utilizes hot gases or air under pressure as a power source, is the choice of suitable sections that will result in an economical, strong and light construction and at the same time protect the elements from the hot gases and reduce frictional, heat transfer, and other power losses to a minimum.

It is a primary object of this invention, to provide in a simple manner, a rotor head and rotor blade construction that is economical, strong and light enough to withstand the internal pressure of the hot gases or air and all other forces acting thereon and at the same time protect the bearings and other elements from the hot gases and reduce frictional, heat transfer and other power losses to a minimum, while preventing the formation of ice on the leading edges of the rotor blades.

Another object of the invention is to provide a rotor head and rotor blade construction with allowance for the thermal expansion and contraction of the parts in order to prevent distortions of the sections.

A further object of the invention is to provide a rotor head and rotor blade construction that lends itself to the easy mass balancing of the rotor blade about its longitudinal axis.

Another object of the invention is to provide a rotor head and rotor blade construction in which the blades are rotatably mounted about their longitudinal axes for cyclic and collective pitch control and spherically mounted at their inner ends for flapping and dragging movements.

Another object of the invention is to provide a rotor head and rotor blade construction that is directly mounted on a main control valve controlling the flow of the hot gases or air to the rotor blades, to the rear for direct forward thrust or partially to both, and to jet-steering nozzles.

Other objects and advantages of the present invention will become apparent from the following detailed description of a preferred embodiment of the invention illustrated in the accompanying drawings wherein like reference characters designate corresponding parts throughout the several views and wherein:

Figure 3 is an enlarged sectional view of my improved rotor head and rotor blade construction, as observed in the plane of line 3—3 on Figures 4 and 5.

Figure 4 is a plan view of the rotor head, as observed in the plane of line 4—4 on Figure 3.

Figure 5 is a transverse sectional view of the main control valve as observed in the plane of line 5—5 on Figure 3.

Figure 6 is a transverse sectional view of the rotor head as observed in the plane of line 6—6 on Figure 3.

Figure 7 is a broken plan view of the improved rotor blade construction.

Figure 8 is a broken elevational view of the improved rotor blade construction, partially in section.

Figure 9 is a transverse sectional view of the rotor blade construction as observed in the plane of line 9—9 on Figure 7.

Figure 10 is a transverse sectional view of the rotor blade, as observed in the plane of line 10—10 on Figure 7.

Figure 11 is a transverse sectional view of the rotor blade, as observed in the plane of line 11—11 on Figure 7.

Figure 12 is a transverse sectional view of the rotor blade as observed in the plane of line 12—12 on Figure 7.

Figure 1:
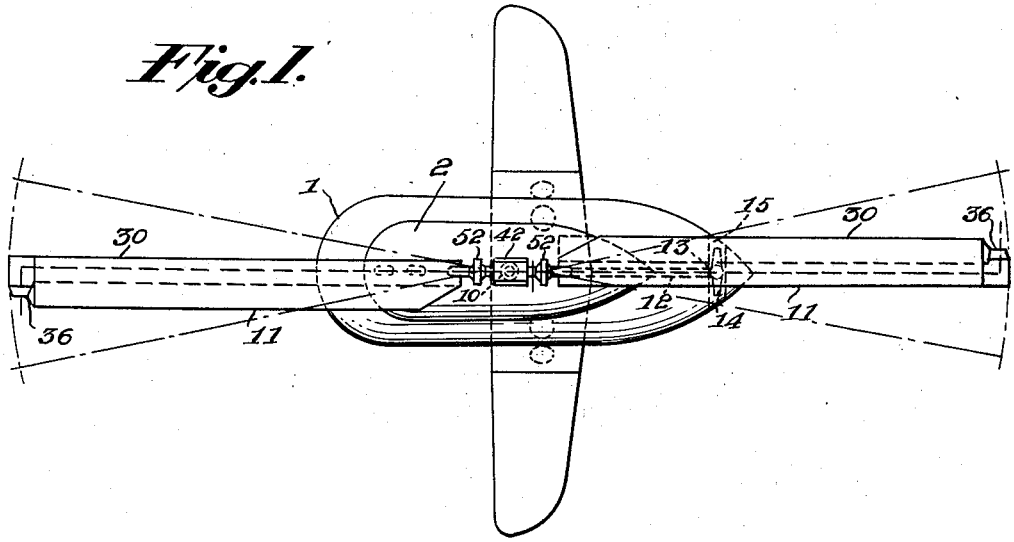
Figure 1 is a top plan view of a jet-powered rotary-wing aircraft embodying my invention in a preferred structural embodiment thereof.

The jet-powered rotary-wing aircraft embodying my invention has a fuselage 1 and is provided with an engine compartment 2 which extends longitudinally of the fuselage. There is provided landing gear 3 which is preferably retractable.

Within the compartment 2 is an engine 4 of the turbojet type having an inlet 5 opening to the front end of the compartment, and from this engine extends an exhaust tube 6 which connects to a main rotary pressure jet control valve 7. A branch exhaust tube 8 extends toward the rear end of the chamber where it terminates in a discharge nozzle 9 from which the discharging jet produces a direct forward thrust.

The turbojet engine 4 may use common liquid fuels or nuclear (atomic) fuels as a heat source.

A branch exhaust tube 10 extends upwardly from the rotary control valve 7 and rises from the top of the engine compartment for providing propelling fluid for the blades 11 of the rotor.

Still another branch exhaust tube 12 extends from the rotary control valve 7 towards the rear end of the chamber and then downwardly into the fuselage towards the rear end thereof where it terminates in a 3-way rotary jet-steering control valve 13. Exhaust tubes 14 and 15 for discharging steering jets from the control valve 13 extend from opposite sides thereof.

The control valve 13 is actuated by levers to which are attached cables connected at the front end of the fuselage with foot pedals. By pushing upon these foot pedals with his feet the pilot may adjust the control valve 13 and shut off flow of fluid through both steering tubes or allow flow of steering jet through a predetermined steering tube 14 and 15 according to which direction a turn is to be made.

Referring to Figures 3 and 5, the rotary control valve 7 is provided on the inside thereof with the rotary valve element 16 which is provided with arms 17. The arms 17 are secured and keyed to spindles or shafts 18 and 19. The spindle 19 extends through the casing of control valve 7 and has secured thereto the link 20. When desired, to control the flow of the exhaust gases to the jet-steering control valve 13, another valve element 21 provided with arms 22 is mounted and keyed to the spindles 18 and 19. Elongated keyways 23 are provided in arms 22 for restricted movement of valve element 21 between the stops 24. Metallic packing seals 25 are provided around openings to prevent leakage past valve elements 16 and 21.

As shown in the drawings, propelling fluid exhausting from the engine will be directed to the rotor blades 11 and the jet steering control valve 13 since exhaust branches 10 and 12 are uncovered by valve elements 16 and 21. Control valve 7 is actuated by a rod 26 pivoted at the upper end to the link 20 and at the lower end to the bellcrank lever 27 to which is attached the rear end of a rod 28 which has its front end connected with a lever 29 within reach of the operator of the craft. By movement of the lever 29 in a forward direction exhaust branches 10 and 12 will be covered by the valve elements 16 and 21 while exhaust branch 8 will be uncovered, thus directing the exhaust jet from the engine rearward to produce a direct forward thrust.

The blades 11 are of hollow metal formation preferably of welded construction and are provided with airfoils 30. Tubes 31 which are elliptical in cross section, preferably extruded, extend longitudinally for the full length of the hollow blades and form the leading part of the airfoil section. Outer end portions of the elliptical tubes 31 project beyond the airfoils 30 of the blades and make a right angle mitered turn 32. The trailing half of the tubes 31 inside the airfoils 30 are made thinner than the leading half of the tubes 31 to help mass balance the blades about their longitudinal axes 33.

Inside of elliptical tubes 31 and extending for the full length of the blades are circular tubes 34 branching from and welded to the circular tube portion 35 at the inner ends of the rotor blades. Outer end portions of the circular tubes 34 terminate in circular exhaust nozzles 36 from which jets are emitted imparting turning movement to the rotor in the opposite direction of the issuing jets.

The circular tubes in the leading half side of the tubes 31 are thicker than the tubes 34 in the trailing half side of the tubes 31 and this too facilitates the mass balancing of the blades about their longitudinal axes 33. Hot gases passing through the tubes 34 at the leading edge of the airfoils 30 prevents the formation of ice, an important consideration.

The circular tubes 34 are ideally suited for conveying the hot gases along the long path of the blades to the circular nozzles 36 for the obvious reasons of facilitating mass balancing, best withstanding the internal pressure of the gases and giving the largest hydraulic diameter and hence the least friction power loss and restriction factor. The spaces between the elliptical tubes 31 and the circular tubes 34 are filled with heat resisting insulation 37 to reduce heat transfer power losses.

Welded to the elliptical tubes 31 for the full length of the rotor blades are the transverse ribs 38 to give support to the blade covering 39 of the airfoils 30. Every fourth transverse rib 38 is made of a double rib 40 with a space between the ribs which is filled with a suitable gasket material to allow for expansion and contraction and prevent thermal distortions of the airfoil section of the blades.

The space of the airfoil section of the blades between the elliptical tubes 31, blade covering 39 and the transverse ribs 38 and 40 may be filled with a plastic heat resisting material 41 or other suitable light honeycomb material to give additional support and rigidity to the blade covering 39.

The blades 11 are rotatably mounted through opposite ends of a detachable rotor head 42 in combined radial and thrust ball bearings 42a, and are held against outward displacement by nuts 42b. The ball bearings 42a are mounted in ball bearing retainers 42c which in turn are carried by the tubular members 43 welded to the inner circular ends of the blades 11. The space between the inner ends of the blades 11 and the tubular members 43 are filled with heat resisting insulation 44 to protect the ball bearings 42a from the heat and at the same time reduce heat transfer power losses.

Encased insulation 44a at the outer and side surfaces of bearings 42a serve the same purpose. Packing glands and packing 45 are provided to prevent escape of fluid and retain lubricant. A vane 46 is secured to rotor head 42 for easing the flow of fluid. The branch exhaust tube 10 extends downwardly from the rotor head into the engine compartment, where it is rotatably mounted in the combined radial and thrust ball bearings 47, and is held against vertical displacement by nut 47a. The ball bearings 47 are mounted on a ball bearing retainer 47b which in turn is carried by the tubular member 48 welded to the branch exhaust tube 10. The space between the exhaust tube 10 and the tubular member 48 is filled with heat resisting insulation 49 to protect the ball bearings 47 and any other parts which may be mounted on the rotor head, from the heat and at the same time reduce heat transfer power losses.

The ball bearings 47 are carried by the split ball bearing housing 50 which in turn is carried by and mounted on the top of the main rotary control valve 7. Encased insulation 50a at the bottom of housing 50 serves to diminish heat transfer from the control valve 7 to the housing 50. Metallic gaskets 51 are used throughout in making up pressure joints between flat surfaces. The exhaust tube 10 and tubular member 48 have their lower ends in telescoping engagement, through suitable stuffing box 48a, with the upper outlet of control valve 7. Packing glands and packing 50a are provided to retain the lubricant.

Figure 2:
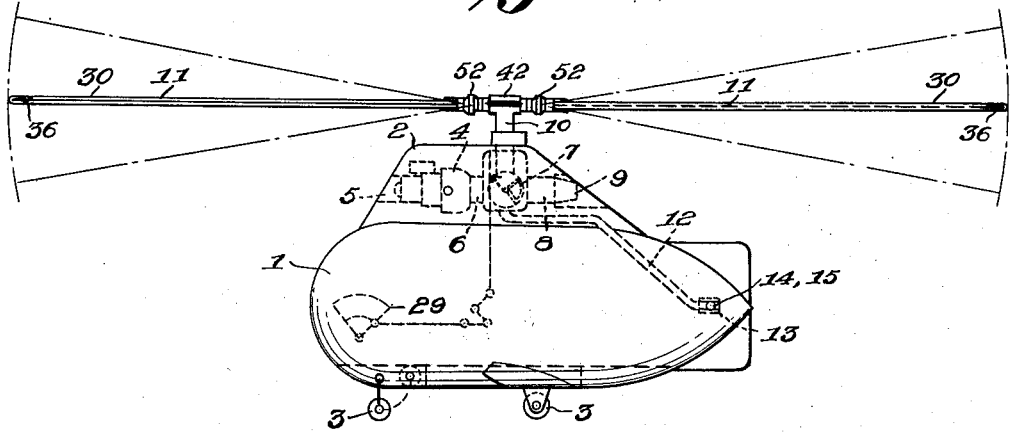
Figure 2 is a side view of the aircraft shown in Figure 1.

With rotary control valve 7 set as shown in Figure 3 fluid will enter the rotor head through exhaust tube 10 and pass out through the circular tubes 34. Hollow spherical joints 52 with pins 52a are provided at the inner ends of the rotor blades and permit movement of the blades, within defined limits, in a vertical plane (flapping) and movement in a horizontal plane (dragging) as indicated by the dot and dash lines in Figures 1, 2, 7 and 8.

Referring to Figures 7 and 8, inner end spherical portions 52b of the joints are provided with slots 52c which engage the pins 52a held in the socket 52d formed about the spherical portions 52b. Metallic packing 52e is fitted in the socket 52d to form a tight joint. A nut 52f screwed on the socket 52d is provided to hold the packing 52e in place and compress it. Cover plates 52g are welded on the inside of the spherical portions 52b over the slots 52c to further prevent leakage and to reinforce the slotted portions.

The rotor blades 11 are turned about their longitudinal axes to obtain pitch adjustment by imparting vertical movement to L-shaped arms 53 provided with clamps 53a secured to the blades, through the links 54 connected at the lower ends to a conventional swashplate 55 comprising a universally mounted ball bearing. The outer race of the swashplate has secured thereto an arm 56 and another arm 56a at right angles to arm 56 which are connected with a cyclic or differential pitch control lever or stick 57 by linkage 57a and as the lever or stick is mounted for universal tilting movement it may be moved forward, backward, to the right, or to the left, and the blades turned for selective pitch adjustment.

The swashplate 55 may be raised or lowered to effect a simultaneous or collective change of blade pitch by means of collective pitch lever or stick 58 which is connected by linkage 58a to a forked lever 59 pivotally mounted and connected to the inner ring of the swashplate. Circular tube portions 35 at the inner ends of the rotor blades are provided with bolted flanges 60 and a hinge 60a so that the blades may be folded back to reduce the storage space necessary for the aircraft.

Obviously, minor changes may be made in the preferred embodiments of my invention without departing from the spirit of the invention, and it is therefore understood that the specific embodiments shown and described are illustrative only of the invention and not restrictive, and that changes in construction and arrangement of parts may be made within the scope of the claim.

What I claim and desire to secure by U.S. Letters Patent is:

In a jet-powered helicopter comprising a fuselage, an exhaust tube projecting upwardly from the fuselage and providing a support for a rotor including a rotor head having combined radial and thrust ball bearings disposed at each side of said exhaust tube, a pair of rotor blades, each comprising a tubular portion at the inner end thereof rotatably supported in one of said bearings; the improvement, wherein each of said rotor blades comprises a covering of air-foil formation having a leading edge and a trailing portion, a hollow member of elliptical form in cross section disposed in said rotor blade and extending longitudinally thereof adjacent the leading edge, a plurality of circular exhaust tubes disposed within said elliptical member and extending longitudinally thereof, insulation material in said elliptical member in surrounding relation to said circular exhaust tubes, a plurality of longitudinally spaced ribs in said trailing portion attached to said elliptical member and disposed within said air-foil shaped covering, insulation material interposed between said ribs and said covering and filling the spaces therebetween, and a plurality of rearwardly exhausting nozzles at the outer end of each of said air-foil coverings forming the outer ends of each of said longitudinally extending tubes.

References Cited in the file of this patent

UNITED STATES PATENTS

| | | |
|---|---|---|
| 1,339,284 | Petry | May 4, 1920 |
| 1,471,764 | Wheeler | Oct. 23, 1923 |
| 2,092,077 | Knight | Sept. 7, 1937 |
| 2,396,130 | Sbrilli | Mar. 5, 1946 |
| 2,552,008 | Laskowitz | May 8, 1951 |
| 2,631,676 | Hiller | Mar. 17, 1953 |
| 2,645,435 | Pouit | July 14, 1953 |
| 2,688,371 | Sforza | Sept. 7, 1954 |
| 2,690,886 | Laskowitz | Oct. 5, 1954 |

FOREIGN PATENTS

| | | |
|---|---|---|
| 931,296 | France | Oct. 6, 1947 |